(12) United States Patent
Patterson et al.

(10) Patent No.: US 8,307,843 B2
(45) Date of Patent: Nov. 13, 2012

(54) TEMPERATURE-CONTROLLED PRESSURE REGULATORS

(75) Inventors: Daryll Duane Patterson, N. Brooklyn Park, MN (US); Eric Jacob Burgett, Eden Prairie, MN (US); Jonathan Elliot Berg, Milaca, MN (US); Keith Duwayne Monson, Ramsey, MN (US); Sheila Snitker McKee, Arden Hills, MN (US)

(73) Assignee: Tescom Corporation, Elk River, MN (US)

( * ) Notice: Subject to any disclaimer, the term of this patent is extended or adjusted under 35 U.S.C. 154(b) by 727 days.

(21) Appl. No.: 12/357,178

(22) Filed: Jan. 21, 2009

(65) Prior Publication Data

US 2010/0180959 A1 Jul. 22, 2010

(51) Int. Cl.
*F16K 49/00* (2006.01)
*F16K 53/00* (2006.01)

(52) U.S. Cl. .... 137/340; 137/341; 137/505; 137/505.42

(58) Field of Classification Search ................. 137/334, 137/339, 340, 341, 505–505.47
See application file for complete search history.

(56) References Cited

U.S. PATENT DOCUMENTS

| | | | |
|---|---|---|---|
| 3,804,595 A * | 4/1974 | Scott | 422/105 |
| 4,263,260 A | 4/1981 | Brautigam | |
| 4,590,770 A | 5/1986 | Howard | |
| 4,966,695 A | 10/1990 | Joshua | |
| 5,123,398 A | 6/1992 | Klaus et al. | |
| 5,373,725 A * | 12/1994 | Sironi et al. | 73/23.39 |
| 5,443,083 A | 8/1995 | Gotthelf | |
| 5,848,223 A * | 12/1998 | Carlson | 392/478 |
| 5,890,512 A * | 4/1999 | Gotthelf et al. | 137/484.6 |
| 6,345,611 B1 * | 2/2002 | Hartman et al. | 123/553 |
| 6,666,074 B2 * | 12/2003 | Gerner et al. | 73/61.52 |
| 6,816,669 B2 | 11/2004 | Zimmer et al. | |
| 7,021,329 B2 | 4/2006 | Hyde et al. | |
| 7,165,573 B2 * | 1/2007 | Gotthelf | 137/505.34 |
| 2006/0081290 A1 | 4/2006 | Sachs | |
| 2006/0243427 A1 * | 11/2006 | Kitajima et al. | 165/104.33 |
| 2010/0180960 A1 | 7/2010 | Patterson et al. | |

OTHER PUBLICATIONS

International Searching Authority, "International Search Report," issued in connection with international application serial No. PCT/US2010/020658, mailed May 3, 2010, 3 pages.

International Searching Authority, "Written Opinion of the International Searching Authority," issued in connection with application serial No. PCT/US2010/020658, mailed May 3, 2010, 7 pages.

Advanced Pressure Technology, "Series VS 1000 Vaporizing Steam Heated Single Stage Pressure Regulator," Product Bulletin for Series VS 1010 Regulators, Sep. 2006 (2 pages).

Aqua Environment Co, Inc., "Operation and Maintenance Model 873H-1500 & -5000 Regulators," Technical Bulletin for Model 873-1500 & -5000 Regulators (2 pages).

(Continued)

*Primary Examiner* — Stephen M Hepperle
*Assistant Examiner* — Seth Faulb
(74) *Attorney, Agent, or Firm* — Hanley, Flight & Zimmerman, LLC

(57) ABSTRACT

Temperature-controlled pressure regulators are described. An example temperature-controlled pressure regulator described herein includes a regulator body having an inlet fluidly coupled to an outlet via a first passageway. A heat block is disposed within the regulator body and receives at least a portion of the first passageway. The heat block is to provide heat to the process fluid as the process fluid flows through the heat block via the first passageway, which separates the process fluid from the heat block.

29 Claims, 8 Drawing Sheets

OTHER PUBLICATIONS

Laboratory Equipment, Concoa 452 Series, "Vaporizing Regulators Heated by Steam or Electric," www.laboratoryequipment.com, archived on Jan. 12, 2007 (3 pages).

Controls Corporation of America (CONCOA), "452 Series Vaporizing Regulators," Installation and Operation Instruction, Manual for 452 Series Vaporizing Regulators, May 2005 (12 pages).

Purity Plus, "Concoa 452 Series, Single Stage, Stainless Steel Barstock Heated Regulator," Product Bulletin for 452 Series Regulators, www.purityplusgas.com (2 pages).

Controls Corporation of America (CONCOA), "308 Series Regulator," Product Bulletin for 308 Series Regulators, www.concoa.com, Aug. 2002 (2 pages).

Controls Corporation of America, "8000 Series Regulators," Products Bulletin for 8000 Series Regulator, www.concoa.com (1 page).

Go Regulator, "CV Series Cylinder Vaporizer," Product Bulletin for CV Series Electrically Heated Two-Stage Pressure Regulators (3 pages).

Go Regulator, "DHR Series," Product Bulletin for DHR Series Electrically Heated Dual-Pressure Regulators (3 pages).

Go Regulator, "DHR Series," Product Bulletin for DHR Series Steam Heated Dual-Pressure Regulators (3 pages).

Go Regulator, "HPR-2 Series," Product Bulletin for HPR-2 Series Electrically Heated Regulators (3 pages).

Go Regulator, "HPR-2 Series," Product Bulletin for HPR-2 Series Steam Heated Regulators (2 pages).

Go Regulator, "HPR-2XW Series," Product Bulletin for HPR-2XW Series Electrically Heated Pressure Regulators (3 pages).

Go Regulator, "MV-1 Series," Product Bulletin for MV-1 Series Miniature Vaporizing Pressure Regulator (3 pages).

Conoflow ITT Industries, "Conoflow High-Pressure Regulator—HP550," Product Bulletin for Conoflow High Pressure Regulator HP550, Pressure Reducing—Vaporizing Series Regulators, Jan. 31, 2003 (4 pages).

Conoflow ITT Industries, "Conoflow High-Pressure Regulator—HP555," Product Bulletin for Conoflow High-Pressure Regulator HP555 Electric Vaporizing Regulators, Jan. 31, 2003 (4 pages).

Pressure Tech 2000, "XHR/SHR 300 Series," Product Bulletin for XHR/SHR 300 Series Electric and Steam Heated Regulators (2 pages).

Pressure Tech 2000, "XHR-300 Series," Product Bulletin for XHR-300 Series, 'Low Flow' Electric and Steam Heated Regulators (2 pages).

Swagelok, "Steam-Heated Regulators," Product Bulletin for KSV Series Steam-Heated Regulators (2 pages).

Swagelok, Product Bulletin for KEV Series Pressure Regulators (2 pages).

TESCOM Industrial Controls, "Vaporizing Regulators," Product Bulletin for 44-4800 Series Vaporizing Regulator, Emerson Process Management, May 2006 (4 pages).

TESCOM, "Vaporizing Regulators," Product Bulletin for 44-4800 Series Vaporizing Regulator, Emerson Process Management (4 pages).

Parker Hannifin Corporation, "Vaporizing Regulators," Vaporizing Regulator Instruments/Analyzers Products Catalog 4512, Apr. 2005 (16 pages).

DRUVA, Products Bulletin for LRX 500 and GVW 250 Series Regulators (1 page).

Precise Equipment Company, Ltd., "160 CFH Heater," Product Bulletin for 160 CFH Heater, 2006 (2 pages).

Porter Instrument Company, "Porter Vaporizer," Product Bulletin for D8000 Series Vaporizer Module (1 page).

MSP Corporation, "Model 2800," Product Bulletin for Model 2800 Turbo-Vaporizer, 2004 (4 pages).

Brooks Instrument, "Brooks/MSP 2800 Turbo-Vaporizer System," Product Bulletin for Brooks/MSP 2800 Turbo-Vaporizer System, Emerson Process Management (2 pages).

Brooks Instrument, "Brooks/MSP 2800 Turbo-Vaporizer System," Product Bulletin for Brooks/MSP 2800 Turbo-Vaporizer System, Emerson Process Management, Jul. 2005 (8 pages).

TESCOM, "Electrical Heating for Specialty Gas Regulators," Product Bulletin for Electrical Heating for Specialty Gas Regulators, Emerson Process Management (2 pages).

Go Regulator, "CV Series Cylinder Vaporizer," Product Bulletin for CV Series Steam Heated Two-Stage Pressure Regulators (3 pages).

Go Regulator, "HPR-2XW Series," Product Bulletin for HPR-2XW Series Steam Heated Pressure Regulators (3 pages).

Pressure Tech 2000, "XHR-301 Series," Product Bulletin for XHR-301 Series, 'Low Flow' Electric and Steam Heated Regulators (2 pages).

A+ Corporation, LLC, "Genie Heated Regulator," Product Bulletin for Model GHR of Genie Heated Regulators, 2005 (2 pages).

United States Patent and Trademark Office, "Non-Final Office Action," issued in connection with U.S. Appl. No. 12/357,275, mailed Aug. 2, 2011, 16 pages.

International Bureau, "International Preliminary Report on Patentability," issued in connection with international application serial No. PCT/US2010/020658, issued Jul. 26, 2011, 7 pages.

United States Patent and Trademark Office, "Non-Final Office Action," issued in connection with U.S. Appl. No. 12/357,275, issued Feb. 8, 2012, 15 pages.

International Searching Authority, "International Search Report," issued in connection with international application serial No. PCT/US2009/068750, mailed Feb. 28, 2012, 5 pages.

International Searching Authority, "Written Opinion of the International Searching Authority," issued in connection with international application serial No. PCT/US2009/068750, mailed Feb. 28, 2012, 10 pages.

International Bureau, "International Preliminary Report on Patentability," issued in connection with international application serial No. PCT/US2009/068750, mailed Mar. 22, 2012, 10 pages.

Polednicek et al., "Flow Unit for Measuring Heats of Mixing at Subambient Conditions," Rev. of Scientific Instr., vol. 76, 074102, Jun. 27, 2005, retrieved from http://scitation.aip.org/getpdf/servlet/GetPDFServlet?filetype=pdf&id=RSINAK000076000007074102000001&idtype=cvips&doi=10.1063/1.1938647&prog=normal, 10 pages.

United States Patent and Trademark Office, "Non-Final Office Action," issued in connection with U.S. Appl. No. 12/357,275, mailed Jul. 26, 2012, 23 pages.

* cited by examiner

TEMPERATURE-CONTROLLED PRESSURE REGULATORS

FIELD OF THE DISCLOSURE

The present disclose relates generally to pressure regulators and, more particularly, to temperature-controlled pressure regulators.

BACKGROUND

Many process control systems use pressure regulators to control the pressure of a process fluid. Pressure reducing regulators are commonly used to receive a relatively high pressure fluid and output a relatively lower regulated output fluid pressure. In this manner, despite the pressure drop across the regulator, a pressure reducing regulator can provide a relatively constant output fluid pressure for a wide range of output loads (i.e., flow requirements, capacity, etc.).

A temperature-controlled pressure regulator is a pressure-reducing regulator that also controls the temperature of the process fluid (e.g., maintains the temperature of the process fluid at a predetermined temperature). Controlling the temperature of the process fluid prevents condensation and/or induces vaporization of the process fluid across the regulator as the pressure of the process fluid is reduced between an inlet and an outlet of the regulator.

Temperature-controlled regulators are often used with fluid sampling systems. A temperature-controlled pressure regulator may be used to preheat liquids, prevent condensation of gases, or vaporize liquids prior to analysis (e.g., chromatographic analysis). For example, a temperature-controlled regulator may be used to heat (e.g., via a heat source) an inlet process fluid containing liquid to be analyzed (e.g., a liquid containing hydrocarbons). Or a temperature-controlled regulator may be used to vaporize (e.g., via a heat source) an inlet process fluid containing a vapor to be analyzed (e.g., a vapor containing hydrocarbons).

SUMMARY

In one example, an example temperature-controlled pressure regulator includes a regulator body having an inlet fluidly coupled to the outlet via a first passageway. A heat block is disposed within the regulator body receives at least a portion of the first passageway. The heat block is to provide heat to the process fluid as the process fluid flows through the heat block via the first passageway, which separates the process fluid from the heat block.

In another example, a heat block for use with a pressure regulator includes a body to be at least partially disposed within the pressure regulator. The body includes a first plurality of apertures to receive a first passageway, which separates a process fluid from the body. The body is adapted to receive a heat source that is to provide heat to the process fluid via the body as the process fluid flows through the first plurality of apertures via the first passageway.

In yet another example, a temperature-controlled pressure regulator includes means for heating a process fluid flowing through a pressure regulator and means for fluidly coupling the process fluid between an inlet and an outlet of the pressure regulator. The means for fluidly coupling the process fluid separates the process fluid from the means for heating. The means for fluidly coupling the process fluid at least partially passes through the means for heating between the inlet and the outlet.

DETAILED DESCRIPTION

Temperature-controlled pressure-reducing regulators typically employ steam or electric heating to control the temperature of a process fluid. The process fluid is heated within the regulator because the process fluid experiences a substantial decrease or drop in pressure through the regulator (e.g., across a valve seat). The decrease in pressure causes a significant loss of heat (e.g., a temperature drop) in the process fluid (e.g., a gas) in accordance with Joule-Thomson effect. A temperature-controlled regulator applies heat at the point of the pressure drop to increase or maintain the temperature of the process fluid, thereby preventing condensation of the process fluid as the pressure of the process fluid decreases across the regulator. In other instances, for example, it may be desirable for a liquid to be vaporized. In this instance, the temperature-controlled regulator applies heat to vaporize the liquid as the liquid passes through the regulator to facilitate, for example, analysis of the liquid via a vapor sample.

Figure 1:
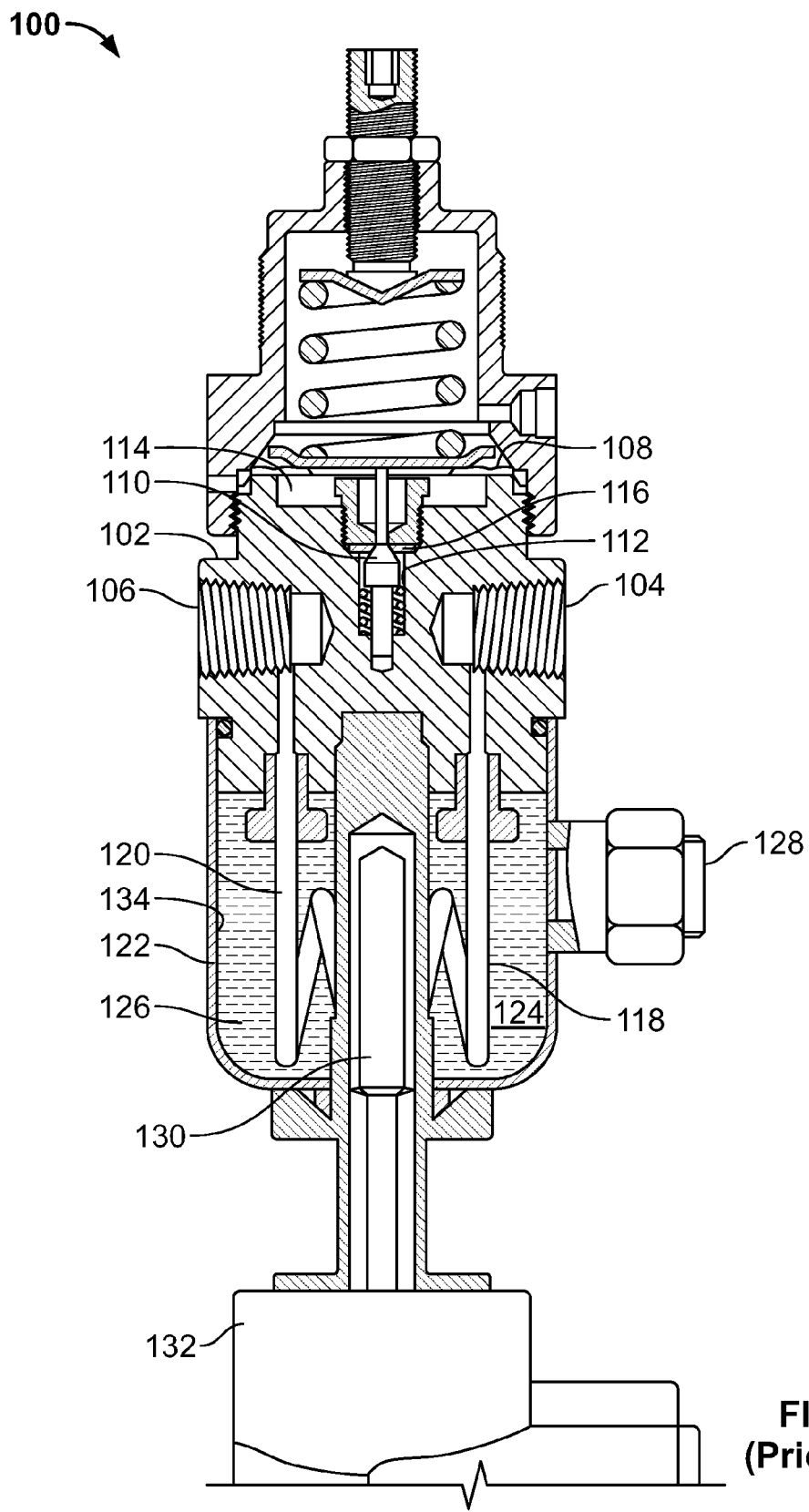
FIG. 1 is cross-sectional view of a known temperature-controlled pressure regulator.

FIG. 1 illustrates a known example temperature-controlled pressure-reducing regulator 100 used to control an outlet temperature (a predetermined temperature) of a process fluid flowing through the regulator 100. The regulator 100 includes a body 102 having an inlet 104 and an outlet 106. A diaphragm 108 and a flow control member 110 (e.g., a valve plug) are disposed within the body 102 to define an inlet chamber 112 and a pressure chamber 114. The diaphragm 108 moves the flow control member 110 relative to a valve seat 116 to control the pressure of the process fluid at the outlet 106. A first passageway 118 fluidly couples the inlet 104 to the inlet chamber 112 and a second passageway 120 fluidly couples the outlet 106 to the pressure chamber 114. A cylindrically-shaped body 122 is coupled (e.g., threadably coupled) to the body 102 of the regulator 100 to form a heat chamber 124. The heat chamber 124 receives at least a portion of the first and second passageways 118 and 120. A medium 126 such as, for example, glycerin (e.g., a glycerin bath), is disposed in the heat chamber 124 via a port 128. A heater 130 (e.g., a cartridge heater) is disposed within the chamber 124 to heat the glycerin. A control unit 132 (e.g., an electrical control unit) is often employed to provide heat to the heater 130, which heats the glycerin to, for example, control the temperature of the process fluid at the outlet 106. As the temperature of the glycerin increases, energy (e.g., thermal energy, heat) from the glycerin is transferred to the process fluid via portions of the first and second passageways 118 and 120 that are disposed or submerged in the glycerin. As a result, in some instances, the increase in heat causes the process fluid to vaporize or, in other instances, prevents condensation of the process fluid, for example, if the process fluid is in a gaseous or vapor state.

However, with the known example regulator 100 of FIG. 1, the media 126 (e.g., glycerin) may be limited in the amount of heat it can transfer to the process fluid. In particular, for example, glycerin may be limited to a maximum temperature (e.g., 400° F.) which, in some instances, may be insufficient to vaporize or prevent condensation of a process fluid. Additionally, glycerin is typically difficult to handle (e.g., messy to handle) and expands when heated and, thus, requires room for expansion within the chamber 124. As a result, a reduced amount of media (e.g., glycerin) in the heat chamber 124 often results in a reduced or lower heat transfer rate. Also, the heated media 126 contacts the surfaces 134 (e.g., inner walls) of the cylindrically-shaped body 122, thereby causing the external surface temperature of the body 122 to increase. Such a configuration limits the maximum temperature of the media (e.g., the glycerin) because the external surface of the body 122 may be required to remain below a certain temperature (e.g., less than 275° F.) to meet industry certifications or standards (e.g., CSA International standards, CE certification, etc.).

In other known examples, a heat source (e.g., a cartridge heater) is disposed within the process fluid. Thus, the process fluid directly contacts the heat source as it flows through the regulator. However, such a configuration typically provides a lower heat transfer rate because the heat source is in contact with the process media for a short duration as the process fluid flows through the regulator, thereby providing lower process fluid outlet temperatures. Also, such a configuration is disadvantageous because some process fluid may cause build-up or deposits (e.g., coking) on the heat source during operation, requiring increased maintenance and expense to clean or replace the heat source.

In yet other known examples, a mesh screen is disposed between the heat source and the process fluid to filter the process fluid to prevent sludge build-up (e.g., carbon deposits) on the heat source. However, such a configuration may cause the filter to become dirty (e.g., due to sludge build-up), thereby requiring additional service and maintenance (e.g., to replace or clean the filter). In yet other known examples, a heat source is coupled to the body proximate to the process fluid. The heat source provides heat to the regulator body which, in turn, provides heat to the process fluid as it flows between an inlet and an outlet of the regulator body. In this configuration, the heat source heats the regulator body containing the process fluid flow path. However, such a configuration may result in poor heat transfer (e.g., a low heat transfer rate) and require more energy to heat or maintain the process fluid at a desired temperature. In some instances, an insufficient heat transfer may cause the process fluid to condense. Additionally, heating the regulator body increases the external surface temperature of the regulator body, which may limit the maximum temperature that can be provided to heat the process fluid in order to meet certification standards (e.g., per CSA International standards).

The example temperature-controlled pressure-reducing regulators described herein reduce the pressure of the process fluid while controlling the temperature of the process fluid (e.g., corrosive fluids, natural gas, etc.) For example, when used in the petrochemical industry, the example temperature-controlled pressure-reducing regulators maintain gaseous samples of the process fluid (e.g., containing hydrocarbons) in the vapor phase for analysis. Additionally, the example temperature-controlled pressure-reducing regulators described herein segregate, separate, or physically isolate the process fluid from a heat block and/or a heat source to prevent or substantially reduce sludge build-up on the heat source and/or the heat block due to condensation (e.g., coking) of the process fluid.

An example temperature-controlled pressure-reducing regulator described herein includes a heater or heat block disposed within the body of the regulator. The heat block is configured to receive a heat source (e.g., a cartridge heater) and at least a partial passageway (e.g., tubing) that carries a process fluid flowing between an inlet and an outlet of the regulator body. Furthermore, the passageway segregates, separates, or physically isolates the process fluid from the heat block (and the heat source). As a result, the example temperature-controlled pressure-reducing regulators described herein provide a relatively higher heat transfer rate which, in turn, results in a substantially greater process fluid outlet temperature. Additionally, the cartridge heater may be thermally isolated from the regulator body to further improve heat transfer. For example, the example regulators described herein can provide process fluid having outlet temperatures up to 300° F. within a relatively quick time period (e.g., within 650 seconds). In contrast, many known temperature-controlled pressure regulators may typically provide process fluid having outlet temperatures up to only 200° F. Thus, the example regulators described herein can provide process fluid having remarkably higher outlet temperatures than many known regulators.

Additionally or alternatively, the example regulators described herein maintain the heat source in a clean condition (e.g., free from sludge build-up due to coking). Additionally, the heat block can withstand a substantially greater maximum temperature than, for example, glycerin, thereby enabling the example regulators to provide a process fluid (e.g., a sample) having a greater or higher outlet temperature. Furthermore, the example regulators described herein can maintain external surface temperatures (e.g., external surface of a body) below a required temperature (e.g., less than 275° F.) to meet certification standards (e.g., CSA International standards, CE certification, etc.) while providing remarkably higher fluid temperatures at the regulator outlet (i.e., outlet temperatures).

Figure 2:
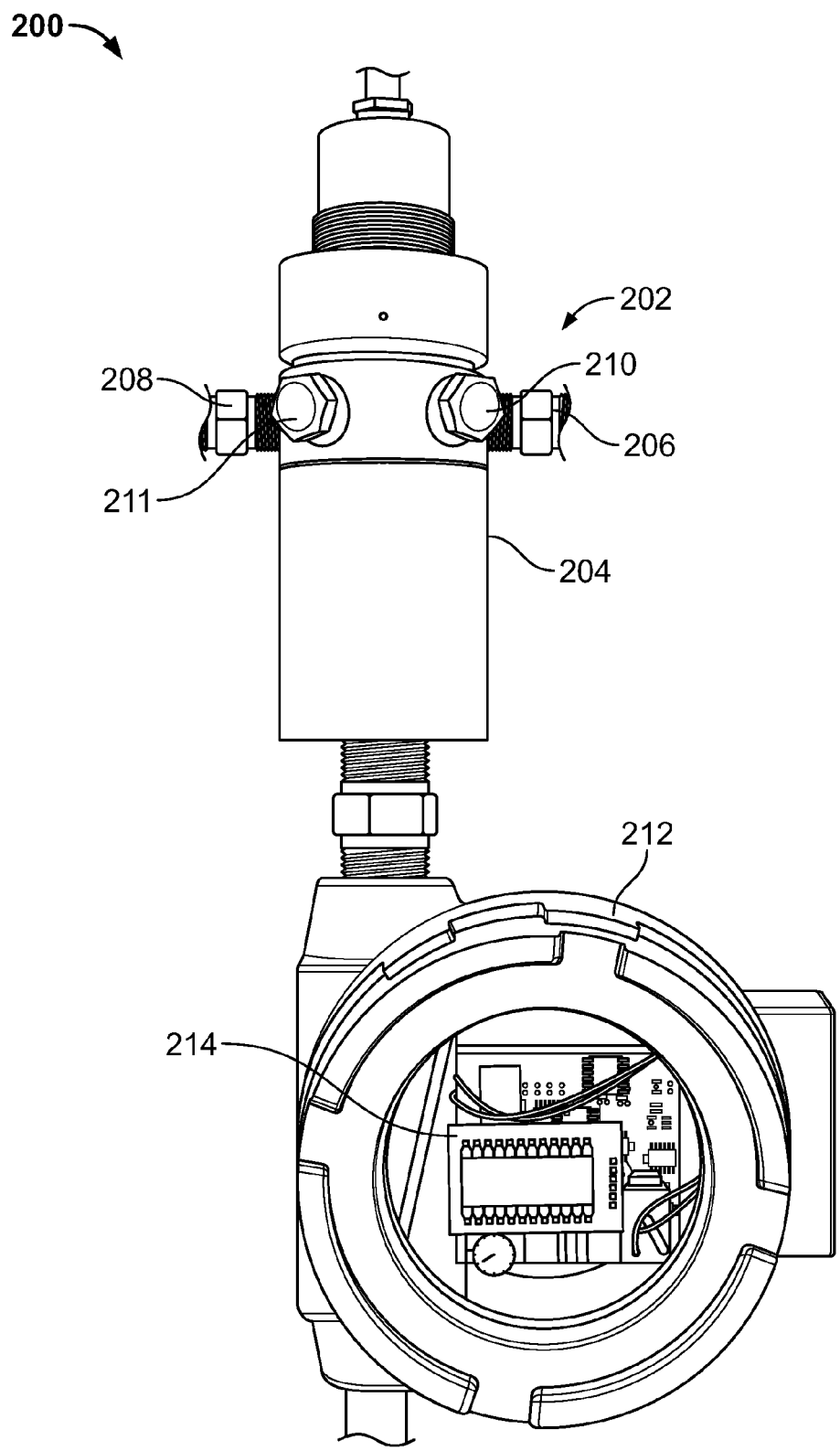
FIG. 2 illustrates an example temperature-controlled pressure regulator described herein.

FIG. 2 illustrates an example temperature-controlled, pressure-reducing regulator 200. The example regulator 200 includes a regulator body 202 coupled (e.g., threadably coupled) to a heating chamber 204. In this example, the heating chamber 204 is a cylindrically-shaped body that threadably couples to the body 202. The regulator body 202 is coupled to an inlet coupling 206 to fluidly couple the regulator 200 to an upstream pressure source and an outlet coupling 208 to fluidly couple the regulator 200 to a downstream device or system. For example, the inlet coupling 206 couples the regulator 200 to, for example, a process control system that provides process fluid (e.g., containing hydrocarbons) at a relatively high pressure (e.g., 4,500 psi) to the regulator 200. The outlet coupling 208 fluidly couples the regulator 200 to, for example, a downstream system such as, for example, a sampling system that demands process fluid at a certain (e.g., a lower) pressure (e.g., 0-500 psi). The sampling system may include an analyzer (e.g., a gas analyzer) that may require the process fluid to be at a relatively low pressure (e.g., 0-500 psi) and the process fluid (e.g., the sample) to be at a temperature (e.g., 300° F.) that causes the process fluid to be in a vapor state to enable or facilitate analysis of the process fluid (e.g., for quality control). The body 202 may also include ports 210 and 211 that receive, for example, pressure gauges (not shown), flow gauges (not shown), etc.

A control unit 212 is operatively coupled to the regulator body 202 and provides power to a heat source or element (not shown) disposed within the heating chamber 204. Additionally, the control unit 212 may include a temperature sensor such as, for example, a thermocouple, a thermistor, etc., operatively coupled to the regulator body (e.g., adjacent the flow path between the inlet and the outlet, disposed within the flow path, etc.) to sense the temperature of the process fluid. The temperature sensor, in turn, provides a signal (e.g., an electrical signal) to the control unit 212. The control unit 212 may be configured to compare the measured temperature of the process fluid (e.g., provided by the temperature sensor) to a desired or predetermined temperature and provide an electrical current to the heating element based on the difference between the measured temperature (e.g., 150° F.) and the predetermined temperature (e.g., 300° F.). Thus, for example, the control unit 212 may enable the heat source or element (e.g., heating element) to be thermostatically controlled. In some examples, the control unit 212 may include a display 214 (e.g., an LCD screen) to indicate, for example, the measured temperature of the process fluid at the outlet 208, the temperature of the heat source, or any other process fluid characteristic (e.g., outlet pressure, etc.).

Figure 3A:
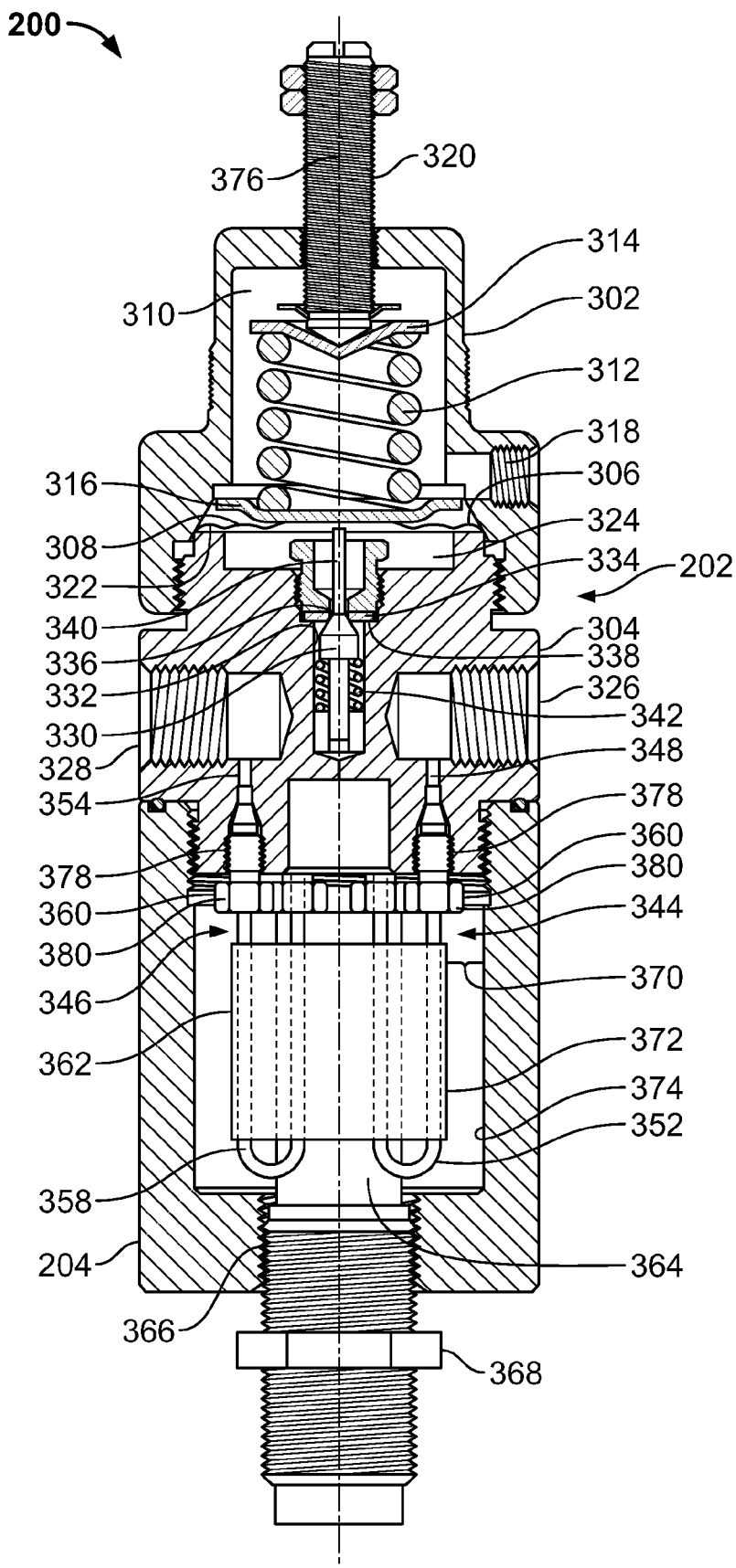
FIG. 3A is a cross-sectional view of the example temperature-controlled pressure regulator of FIG. 2.
Figure 3B:
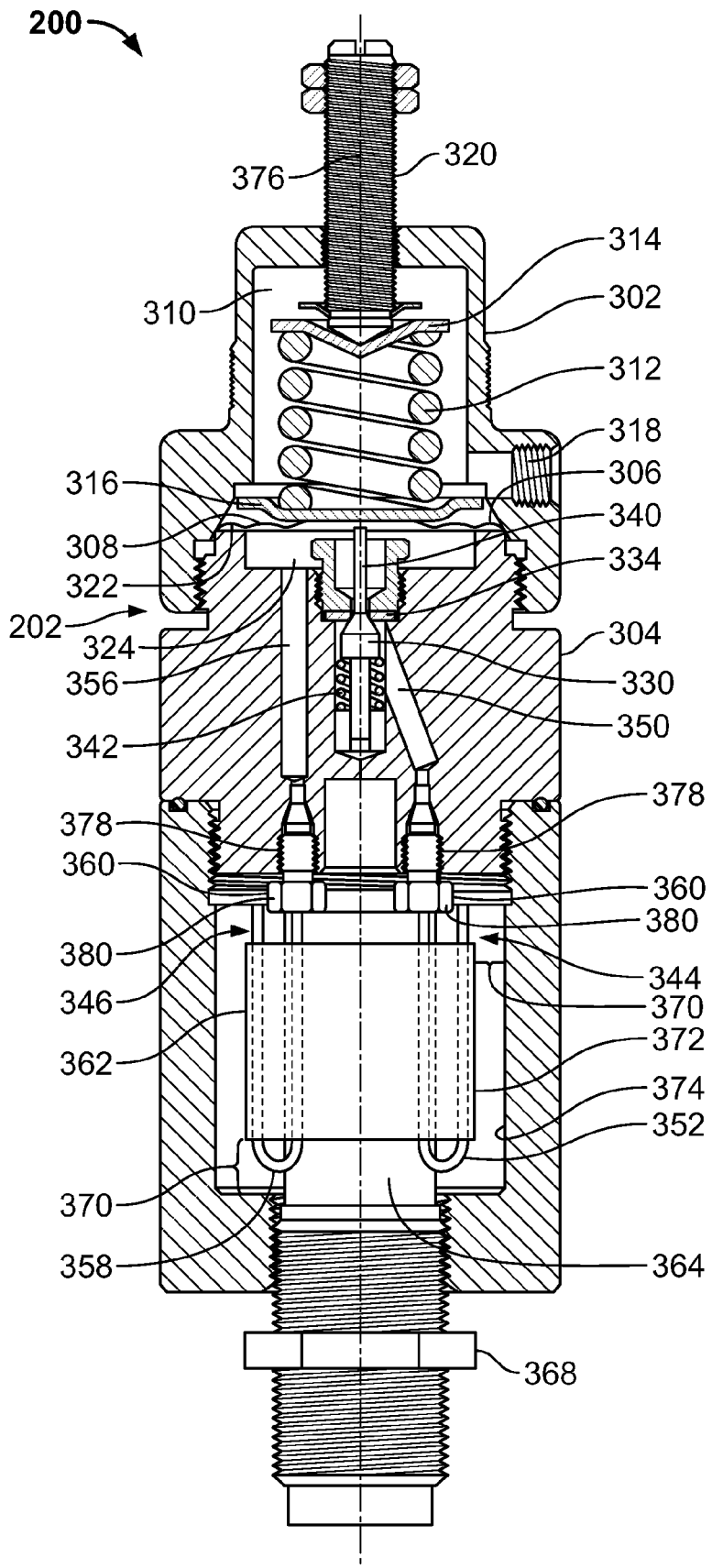
FIG. 3B is another cross-sectional view of the example temperature-controlled pressure regulator of FIG. 2 taken along line 3B-3B of FIG. 2.

FIGS. 3A and 3B are cross-sectional views of the example temperature-controlled pressure-reducing regulator 200 of FIG. 2. In this example, the body 202 includes an upper body portion 302 coupled (e.g., threadably coupled) to a lower body portion 304. A diaphragm 306 is captured between the upper body 302 and the lower body 304. The upper body 302 and a first side 308 of the diaphragm 306 define a first chamber 310. A biasing element 312 (e.g., a spring) is disposed within the first chamber 310 between an adjustable spring seat 314 and a diaphragm plate 316, which supports the diaphragm 306. In this example, the first chamber 310 is fluidly coupled to, for example, the atmosphere, via a port 318. A spring adjuster 320 (e.g., a screw) engages the adjustable spring seat 314 to enable adjustment of the length of the biasing element 312 (e.g., to compress or decompress the biasing element 312) and, thus, adjustment of (e.g., to increase or decrease) the amount of a pre-set force or load that the biasing element 312 is to exert on the first side 308 of the diaphragm 306.

The lower body 304 and a second side 322 of the diaphragm 306 at least partially define a pressure chamber 324, an inlet 326 (e.g., to receive the inlet coupling 206), and an outlet 328 (e.g., to receive the outlet coupling 208). A valve plug 330 is disposed within a longitudinal bore or inlet chamber 332 in the lower body 304. A valve seat 334 is disposed between the inlet chamber 332 and the pressure chamber 324 and defines an orifice 336 in the fluid flow path between the inlet 326 and the outlet 328. In this example, the valve seat 334 engages a shoulder 338 formed via, for example, a counterbore. The valve plug 330 is operatively coupled to the diaphragm 306 via the diaphragm plate 316 and a valve stem 340. In operation, the diaphragm 306 moves the valve plug 330 toward and away from the valve seat 334 to prevent or allow fluid flow between the inlet 326 and the outlet 328. A second spring 342 is disposed within the inlet chamber 332 to bias the valve plug 330 toward the valve seat 334. In the illustrated example, the valve plug 330 can engage the valve seat 334 to provide a tight seal to prevent fluid flow between the inlet 326 and the outlet 328. The spring rate of the second spring 342 is typically substantially smaller relative to the spring rate of the biasing element 312.

As shown in FIGS. 3A and 3B, the inlet 326 is fluidly coupled to the inlet chamber 332 via a first passageway 344 and the outlet 328 is fluidly coupled to the pressure chamber 324 via a second passageway 346. In this example, the first passageway 344 includes integral pathways 348 and 350 which are integrally formed with the regulator body 202, and a removably coupled tubular passageway 352 (e.g., tubing) that fluidly couples the integral pathways 348 and 350 between the inlet 326 and the inlet chamber 332. Similarly, the second passageway 346 includes integral pathways 354 and 356 which are integrally formed with the regulator body 202, and a removably coupled tubular passageway 358 (e.g., tubing) to fluidly couple the integral pathways 354 and 356 between the pressure chamber 324 and the outlet 328. The tubular passageways 352 and 358 are coupled to the regulator body 202 (e.g., the respective integral pathways 348, 350, 354, and 356) via couplings 360 such as, for example, compression fittings. However, in other examples, the inlet 326 and the outlet 328 may be fluidly coupled via other suitable passageways and/or pathways. In this example, the tubular passageways 352 and 358 are tubing made of corrosion resistant material such as, for example, stainless steel. However, in other examples, the tubular passageways 352 and/or 358 may be made of any other suitable material(s).

A heater or heat block 362 is at least partially disposed within the heating chamber 204. In this example, at least a portion of the first passageway 344 (e.g., the tubular passageway 352) and a portion of the second passageway 346 (e.g., the tubular passageway 358) are disposed within a heat block 362. However, in other examples, at least a portion of the first passageway 344 or, alternatively, at least a portion of the second passageway 346 may be disposed within the heat block 362.

A heating element or heat source 364 (e.g., a cartridge heater) is at least partially coupled to the heat block 362. The first and second passageways 344 and 346 segregate, separate or physically isolate the process fluid from the heat block 362 and/or the heat source 364. Thus, the example temperature-controlled pressure-pressure regulator 200 eliminates or substantially reduces sludge build-up on the heat block 362 and/or the heat source 364 due to, for example, coking, thereby facilitating maintenance or servicing (e.g., cleaning) the regulator 200. As noted above, the control unit 212 (FIG. 2) supplies power (e.g., electrical current) to the heat source 364, which provides heat to the heat block 362. The heating chamber 204 includes a port 366 to receive (e.g., threadably receive) a coupling member 368 to couple the control unit and/or the heat source 364 to the heating chamber 204. The coupling member 368 may be substantially thermally isolated from the heat source 364 to improve heat transfer to the heat block 362.

Additionally, the heat block 362 is sized or configured so that a space 370 (e.g., an air gap or pocket) exists between an outer surface 372 of the heat block 362 and a surface 374 of the heating chamber 204. In this manner, the space 370 (e.g., the air gap) may act as an insulator (e.g., provides low heat transfer or a high thermal resistance) to substantially reduce heat transfer between the heat block 362 and the regulator body 202 and/or the surface 374 of the heating chamber 204. In other words, the heat block 362 may be substantially heated (e.g., to 300° F., to 600° F.) and the heating chamber 204 and/or the regulator body 202 may remain substantially cool (e.g., 200° F.) relative to the heat block 362. Such a configuration improves or meets the rating or certification (e.g., CSA International Standards) of the example regulator 200 for use with volatile fluid applications (e.g., flammable and/or explosive environments, etc.). In other examples, insulation or other materials that prevent or substantially reduce heat transfer or increase thermal resistance may be disposed between the outer surface 372 of the heat block 362 and the surface 374 of the heat chamber 204 and/or the regulator body 202. In yet other examples, the heating chamber 204 may be vacuum sealed with the regulator body 202.

Referring to FIGS. 2, 3A, and 3B, in operation, the temperature-controlled pressure regulator 200 typically regulates the pressure of the process fluid at the inlet 326 (e.g., 4,500 psi) to provide or develop a certain pressure at the outlet 328 (e.g., 0-500 psi). The desired pressure set-point (e.g., 500 psi) may be configured by adjusting the force exerted by the biasing element 312 on the first side 308 of the diaphragm 306 via the spring adjuster 320. To achieve a desired outlet pressure, the spring adjustor 320 is rotated or turned about an axis 376 (e.g., a clockwise or counterclockwise direction in the orientation of FIGS. 3A and 3B) to adjust the force exerted by the biasing element 312 on the first side 308 of the diaphragm 306. In turn, the force exerted by the biasing element 312 on the diaphragm 306 positions the valve plug 330 relative to the valve seat 334 (e.g., moves the valve plug 330 away from the valve seat 334 in the orientation of FIGS. 3A and 3B) to allow process fluid flow between the inlet 326 and the outlet 328. Thus, the outlet or desired pressure is dependent upon the amount of pre-set force exerted by the biasing element 312 to position the diaphragm 306 and, thus, the valve plug 330 relative to the valve seat 334.

The pressure chamber 324 senses the pressure of the process fluid at the outlet 328 via the second passageway 346. When the pressure of the process fluid in the pressure chamber 324 increases to exert a force on the second side 322 of the diaphragm 306 that exceeds the pre-set force exerted by the biasing element 312 on the first side 308 of the diaphragm 306, the diaphragm 306 moves toward the first chamber 310 (e.g., an upward direction in the orientation of FIGS. 3A and 3B) against the force exerted by the biasing element 312. When the diaphragm 306 moves toward the first chamber 310, the diaphragm 306 causes the valve plug 330 to move toward the valve seat 334 to restrict fluid flow through the orifice 336. The second spring 342 biases the valve plug 330 toward the valve seat 334 to sealingly engage the valve seat 334 (e.g., in a closed position) to substantially prevent fluid flow through the orifice 336 (i.e., between the inlet chamber 332 and the pressure chamber 324). Preventing or substantially restricting the fluid flow between the inlet 326 and the outlet 328 causes the pressure of the process fluid at the outlet 328 to decrease.

Conversely, the decreasing fluid pressure at the outlet 328 is registered in the pressure chamber 324 via the second passageway 346. When the pressure of the process fluid in the pressure chamber 324 decreases below the pre-set force exerted by the biasing element 312 on the first side 308 of the diaphragm 306, the biasing element 312 causes the diaphragm 306 to move in a direction (e.g., a downward direction in the orientation of FIGS. 3A and 3B) toward the pressure chamber 324. When the diaphragm 306 moves toward the pressure chamber 324, the valve plug 330 moves away from the valve seat 334 to allow fluid to flow through the orifice 336 (e.g., an open position), thereby causing the pressure at the outlet 328 to increase. When the outlet pressure is substantially equal to the pre-set force exerted by the biasing element 312, the diaphragm 306 causes the valve plug 330 to assume a position that maintains the desired outlet pressure and provides the required fluid flow.

The pressure of the process fluid decreases significantly as the process fluid flows across the orifice 336. As a result, the decrease in pressure causes a significant temperature drop in the process fluid (e.g., due to the Joule-Thomson effect). To minimize the Joule-Thomson effect, the process fluid is heated as it flows between the inlet 326 and the outlet 328 of the regulator 200.

As the process fluid flows between the inlet 326 and the inlet chamber 332 via the first passageway 344, the heat source 364 (e.g., via the control unit 212) provides heat to the heat block 362. In this example, the heat block 362 receives a portion of the first passageway 344 (e.g., the tubular passageway 352). The heat block 362 may be heated to, for example, 600° F. The heat is transferred through the heat block 362 and the tubular passageway 352 to heat the process fluid flowing within the tubular passageway 352. In this manner, for example, the process fluid may be heated as it flows through the first passageway 344 prior to flowing across the orifice 336.

Additionally, in this example, an outer diameter of the tubular passageways 352 and 358 is sized (e.g., to have a relatively small outside diameter) such that a substantial amount of process fluid flowing through the tubular passageways 352 and 358 flows adjacent an inner surface (e.g., an inside diameter) of the tubular passageways 352 and 358. In this manner, the heat transfer rate improves when the process fluid flows adjacent the inner surface (i.e., substantially engages or contacts the inner surface) of the tubular passageways 353 and 358.

The process fluid flows between the pressure chamber 324 and the outlet 328 via the second passageway 346. As noted above, the heat block 362 is configured to receive a portion of the second passageway 346 (e.g., the tubular passageway 358). The heat is transferred through the heat block 362 and the tubular passageway 358 to heat the process fluid flowing within the tubular passageway 358 between the pressure chamber 324 and the outlet 328. In this manner, for example, the process fluid may be heated again as it flows through the second passageway 346. In this manner, a process fluid that includes, for example, saturated gases may be maintained in the vapor state.

Thus, the example temperature-controlled, pressure-reducing regulator 200 applies heat to the process fluid flowing through the first and second passageways 344 and 346 (e.g., at the point of the pressure drop) to increase or maintain the temperature of the process fluid at a desired temperature (e.g., 300° F.). Controlling the outlet temperature to a desired or predetermined temperature prevents condensation or induces vaporization of the process fluid as the pressure of the process fluid decreases across the regulator 200. Additionally, the regulator 200 segregates, separates, or physically isolates the process fluid from the heat block 362 and/or the heat source 364 to substantially reduce or eliminate carbon build-up caused by, for example, coking. Additionally, the gap 370 between the heat block 362 and the heating chamber 204 maintains the external surface temperatures of the regulator 200 below a desired or required temperature (e.g., less than 275° F.) to meet certifications standards (e.g., CSA International standards) to enable the example regulator 200 to be used in volatile environments or applications.

Figure 4A:
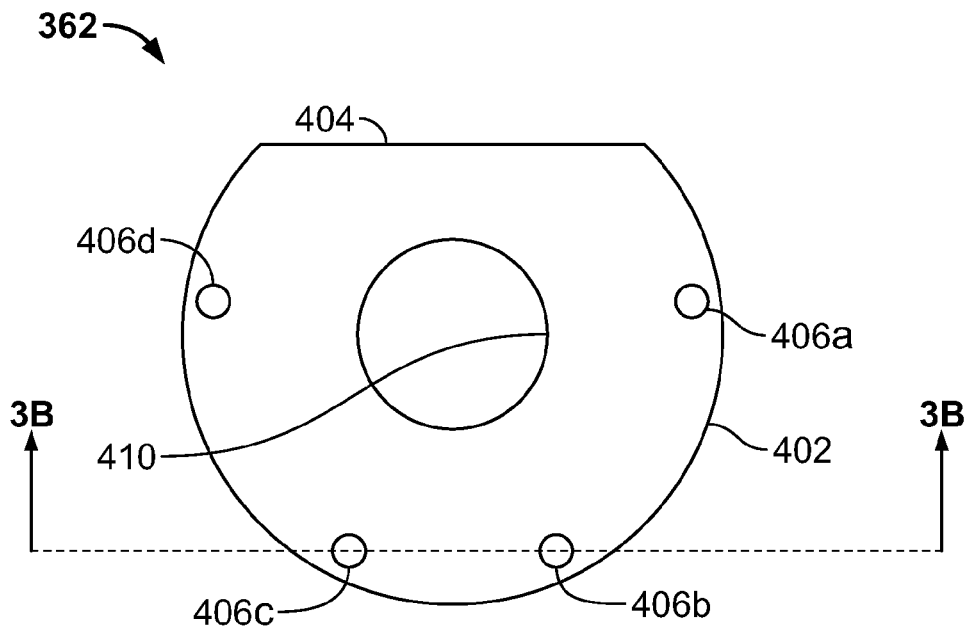
FIG. 4A is a plan view an example heat block of the example temperature-controlled regulator of FIGS. 2, 3A, and 3B.
Figure 4B:
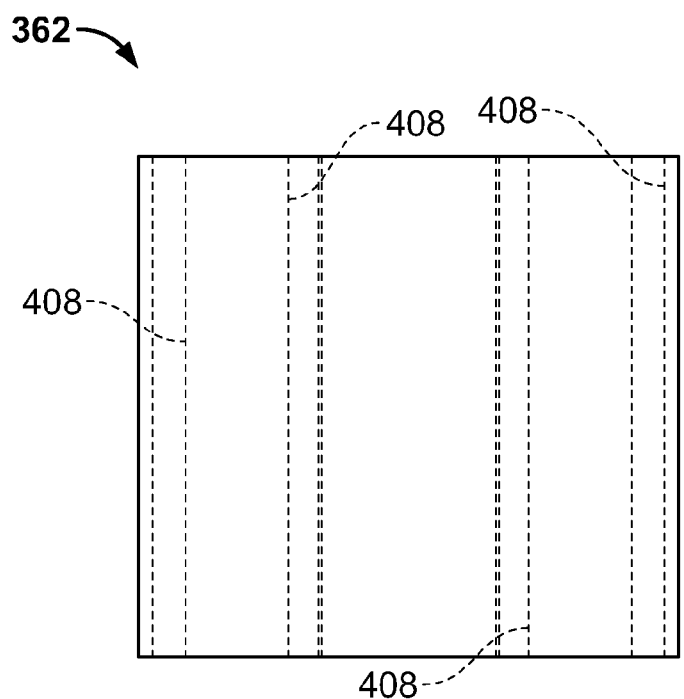
FIG. 4B is a side view of the example heat block of FIG. 4A.

FIG. 4A is a plan view of the example heat block 362 of FIGS. 2, 3A, and 3B. FIG. 4B is a side view of the example heat block 362 of FIGS. 2, 3A, 3B, and 4A. Referring to FIGS. 4A and 4B, the example heat block 362 includes a substantially cylindrical body 402. As shown, a portion 404 of the cylindrical body 402 may be removed to reduce the overall envelope of the heat block 362 to facilitate assembly of the heat block 362 with the regulator 200 of FIGS. 2, 3A and 3B. The heat block 362 includes a plurality of apertures 406a-d sized to receive, for example, the first passageways 344 and/ or the second passageway 346 (FIGS. 3A and 3B). In this example, the heat block 362 includes a first plurality of apertures 406a and 406b to receive the tubular passageway 352 (FIGS. 3A and 3B) and a second plurality of apertures 406c and 406d to receive the tubular passageway 358 (FIGS. 3A and 3B). However, in other examples, the heat block 362 may only include the first plurality of apertures 406a-b or the second plurality of apertures 406c-d to receive the tubular passageway 352 or tubular passageway 358, or any other suitable configuration.

In this example, each of the plurality of apertures 406a-d is sized to have a diameter substantially similar or slightly larger than (e.g., a diameter of about 0.0625 inches) the outer diameter of the tubular passageways 352 and 358 to provide a small or tight tolerance. In this manner, the tight tolerance between the tubular passageways 352 and 358 and the plurality of apertures 406a-d enables an outer surface of the tubular passageways 352 and 358 to substantially engage or contact an inner surface 408 of the plurality of apertures 406a-d, thereby increasing the contact surface area and, thus, the heat transfer (i.e., lowering the thermal resistance) between the heat block 362 and the tubular passageways 352 and 358.

The body 402 includes a bore 410 to receive a heat source such as, for example, the heat source 364 of FIGS. 3A and 3B. In other examples, the bore 410 may be at least partially threaded to threadably receive a heat source and/or a coupling member (e.g., the coupling member 368 of FIGS. 3A and 3B).

The heat block 362 may be made of aluminum and may be machined to provide tight tolerances. In other examples, the heat block 362 may be made of any other suitable material and/or corrosion resistant materials that have high thermal conductivity properties. In yet other examples, the tubular passageways 352 and 358 may be cast-in-place with the heat block 362, or may be made via any other suitable manufacturing process(es).

Figure 5:
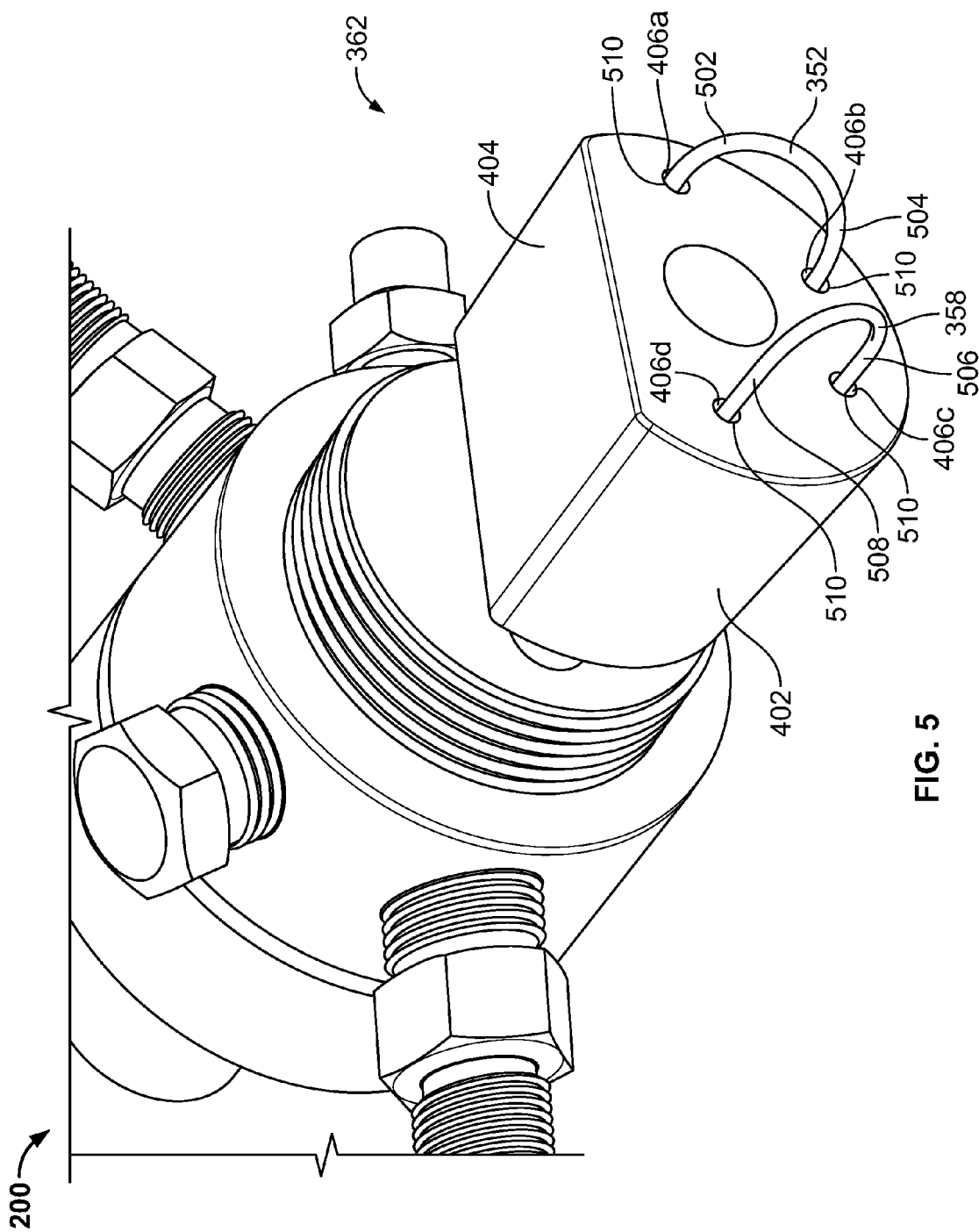
FIG. 5 is another view of the example regulator of FIGS. 2, 3A, and 3B.

FIG. 5 is a partial view of the example temperature-controlled pressure-reducing regulator 200 of FIGS. 2, 3A, and 3B. For clarity, the heat chamber 204 of FIGS. 2, 3A and 3B is removed. In this example, the tubular passageways 352 and 358 pass through the heat block 362 in a U-shaped configuration. As shown, a first end 502 of the U-shaped tubular passageway 352 is disposed within the aperture 406a and a second end 504 of the U-shaped tubular passageway 352 is disposed within the aperture 406b. Likewise, a first end 506 of the U-shaped tubular passageway 358 is disposed within the aperture 406c and a second end 508 of the U-shaped tubular passageway 358 is disposed within the aperture 406b.

However, in other examples, the tubular passageway 352 and/or the tubular passageway 358 may be disposed or pass through (e.g., may be coiled through) a plurality of portions of the heat block 362 to increase the heat transfer area. For example, the tubular passageways 352 and/or 358 may pass through (e.g., snake through) the heat block 362 in a W-shaped configuration, or any other shaped configuration. Passing the tubular passageway 352 through the heat block in this manner (e.g., having a U-shaped configuration, W-shaped configuration, etc.) improves or increases the heat transfer area between the heat block 362 and the process fluid flowing through the tubular passageways 352 and 358. Increasing the heat transfer area provides a greater or increased heat transfer rate or lower thermal resistance between the heat block 362 and the tubular passageways 352 and 358 and, thus, provides greater heat transfer and/or increased efficiency when heating the process fluid (e.g., the process fluid can be heated more rapidly and/or the process fluid can be heated to a higher desired temperature).

As most clearly shown in FIGS. 3A and 3B, in this example, the coupling member 360 (e.g., the compression-type fitting) has a threaded end 378 (FIGS. 3A and 3B) to threadably couple to the regulator body 202. A second end 380 (FIGS. 3A and 3B) (e.g., a compression fitting) couples the tubular passageway 352 and 358 to the regulator body 202. Such compression-type fittings enable the respective ends 502, 504, 506, 508 of the U-shaped tubular passageways 352 and 358 to pass through (e.g., slide within) respective one of the apertures 406a-d of the heat block 362. An epoxy 510 (e.g., a thermally conductive epoxy) may be disposed between outer surfaces of the first and/or tubular passageways 352 and 358 and the respective apertures 406a-d when coupled to the heat block 362 to seal any gaps (e.g., air pockets or gaps) between the outer surfaces of the tubular passageways 352 and 358 the respective inner surfaces of the apertures 406a-d of the heat block 362. A thermally conductive epoxy, for example, improves heat transfer (i.e., reduces thermal resistance) between the heat block 362 and the process fluid flowing through the tubular passageways 352 and 358 by eliminating or substantially reducing any gaps (e.g., air gaps) between the tubular passageways 352 and 358 and the respective apertures 406a-d.

Figure 6:
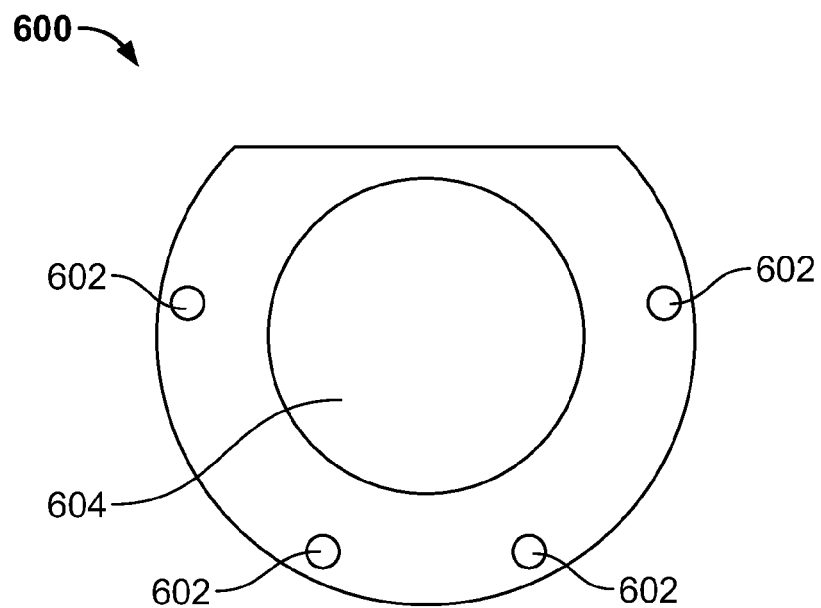
FIG. 6 illustrates another example heat block described herein that may be used to implement the example temperature-controlled pressure regulator of FIGS. 2, 3A, 3B, and 5.

FIG. 6 illustrates another example heat block 600 that may be used to implement the example temperature-controlled pressure-reducing regulator 200 of FIGS. 2, 3A, 3B, 4A, 4B, and 5. In this example, the example heat block 600 includes a plurality of apertures 602 spaced at different locations and/or having different sized diameters than the plurality of apertures 406a-d of FIGS. 4A and 4B. Additionally, the heat block 600 includes a bore 604 having a larger sized diameter than the bore 410 of FIGS. 4A and 4B to receive a larger sized heat source.

Figure 7:
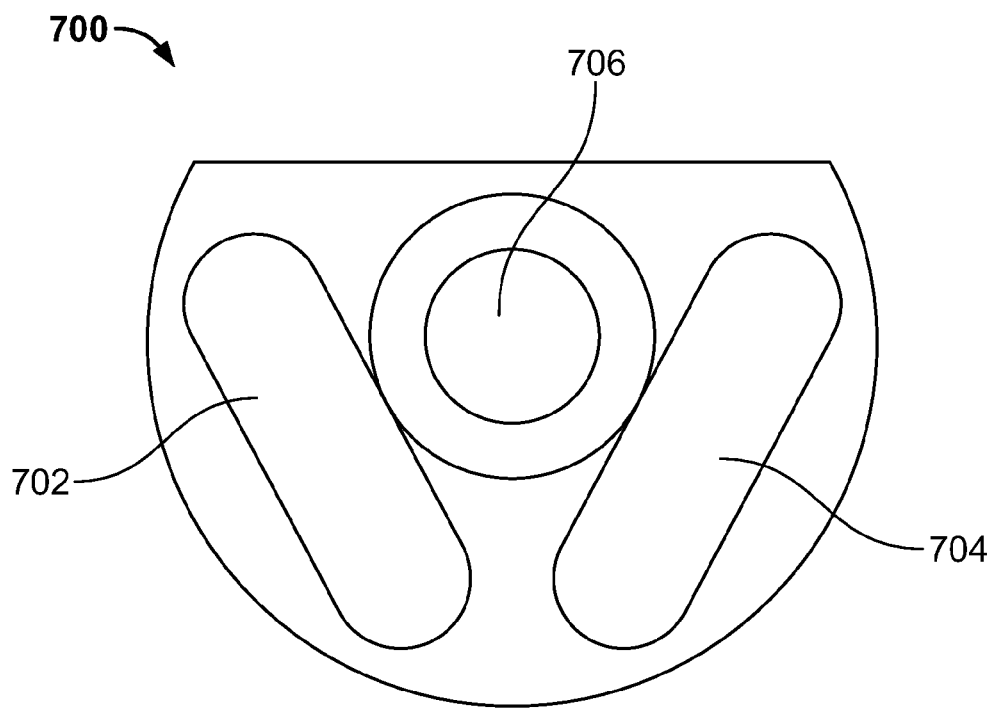
FIG. 7 illustrates another example heat block described herein that may be used to implement the example temperature-controlled pressure regulator of FIGS. 2, 3A, 3B, and 5.

FIG. 7 illustrates another example heat block 700 that may be used to implement the example temperature-controlled pressure-reducing regulator 200 of FIGS. 2, 3A, 3B, 4A, 4B, and 5. The heat block 700 is similar to the example heat block 362 of FIGS. 2, 3A, 3B, 4A, 4B, and 5 and the example heat block 600 of FIG. 6 except that the heat block 700 includes slotted openings 702 and 704 to receive, for example, the tubular passageways 352 and 358 of FIGS. 3A and 3B. However, in other examples, the heat block 700 may include a single slotted opening to receive a tubular passageway (e.g., the tubular passageway 352 or, alternatively, 358 of FIGS. 3A and 3B) or any number of slotted openings. Additionally or alternatively, the slotted openings 702 or 704 may be sized to receive U-shaped tubular passageways, W-shaped tubular passageways or any other shaped tubular passageway. The heat block 700 includes a bore 706 to receive a heat source (e.g., the heat source 364 of FIGS. 3A and 3B).

Figure 8:
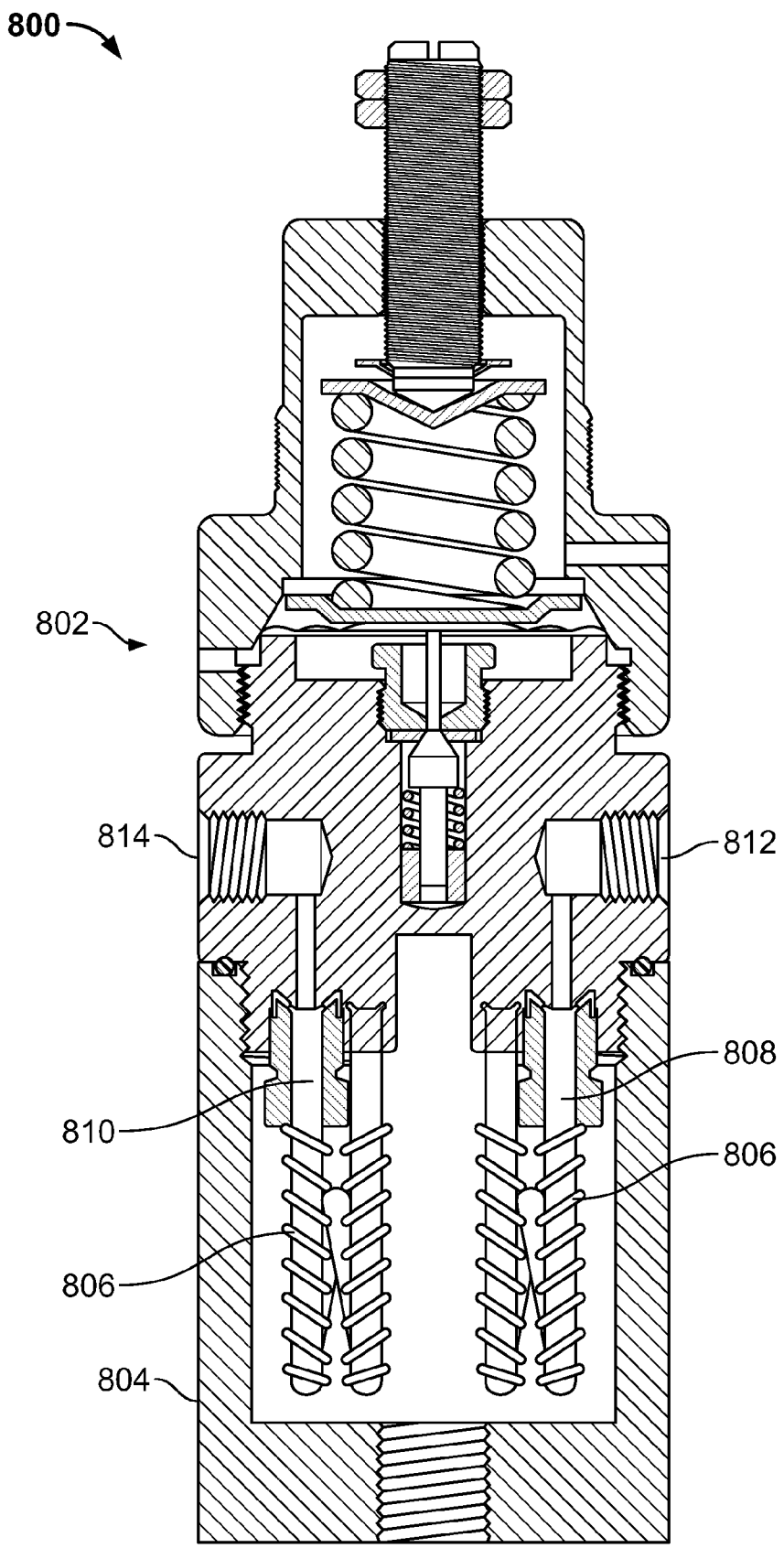
FIG. 8 illustrates another example temperature-controlled pressure regulator described herein.

FIG. 8 illustrates yet another example temperature-controlled pressure-reducing regulator 800. Similar to the example regulator 200 of FIGS. 2, 3A, 3B, and 5, the example temperature-controlled pressure-reducing regulator 800 reduces the pressure of a process fluid flowing through a regulator body 802 while controlling the temperature of the process fluid (e.g., corrosive fluids, natural gas, etc.) substantially similar to the example regulator 200 described above. Those components of the example regulator 800 that are substantially similar or identical to the components of the example regulator 200 described above and that have functions substantially similar or identical to the functions of those components will not be described in detail again below. Instead, the interested reader is referred to the above corresponding descriptions in connection with FIGS. 2, 3A, 3B, and 5. For example, the example regulator 800 of FIG. 8 has a regulator body 802 substantially similar to the regulator body 202 (FIG. 2) and a heating chamber 804 substantially similar to the heating chamber 204 (FIG. 2) shown in the example regulator 200 of FIGS. 2, 3A, 3B, and 5.

Instead of a heat block (e.g., the heat block 362 of FIGS. 3A, 3B, 4A, 4B and 5, the heat block 600 of FIG. 6, or the heat block 700 of FIG. 7), the example regulator 800 is implemented with a heating element 806 that coils or wraps around tubular passageways 808 and 810 (e.g., tubular passageways substantially similar to the tubular passageways 352 and 358 of FIGS. 3A and 3B). The heating element 806 includes an insulation (not shown) to resist or prevent electrical conductivity between the heating element 806 and the tubular passageways 808 and 810. The insulation is disposed between an outer surface of the tubular passageways 808 and 810 and an outer surface of the heating element 806. In this manner, the tubular passageways 808 and 810 may be made of, for example, stainless steel or other metallic corrosion resistant materials. In operation, the heating element 806 is heated via a controller (e.g., the controller 212 of FIG. 2). The controller provides energy (e.g., an electrical current) to the heating element 806. The heating element 806 in turn provides heat to the process fluid via the tubular passageways 808 and 810 as the fluid flows between an inlet 812 and an outlet 814 of the regulator body 802.

Although certain apparatus, methods, and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A temperature-controlled pressure regulator, comprising:
   a regulator body having an inlet fluidly coupled to an outlet via a first passageway, the regulator body defining a heating chamber; and
   a heat block having a heat source, the heat block disposed inside the heating chamber of the regulator body, the heat block having a first opening to receive at least a portion of the first passageway and a second opening to receive at least a portion of the heat source, the heat block to provide heat to the process fluid as the process fluid flows through the heat block via the first passageway and the first passageway is to separate the process fluid from the heat block.

2. A temperature-controlled pressure regulator of claim 1, further comprising a second passageway, wherein the inlet is fluidly coupled to an inlet chamber of the regulator body via the first passageway and the outlet is fluidly coupled to a pressure chamber of the regulator body via the second passageway.

3. A temperature-controlled pressure regulator of claim 2, wherein the heat block includes a third opening to receive at least a portion of the second passageway, wherein the heat block is to apply heat to the process fluid as the process fluid flows through the heat block via the second passageway, and wherein the second passageway separates the process fluid from the heat block.

4. A temperature-controlled pressure regulator of claim 3, further comprising a flow control member disposed within the regulator body between the inlet chamber and the pressure chamber, wherein the flow control member moves between a first position to prevent fluid flow between the inlet and the outlet and a second position to allow fluid flow between the inlet and the outlet.

5. A temperature-controlled pressure regulator of claim 1, wherein the heat block comprises the first opening to receive the first portion of the first passageway and a third opening to receive a second portion of the first passageway, the first and third openings spaced apart about a longitudinal axis of the heat block.

6. A temperature-controlled pressure regulator of claim 2, wherein at least one of the first passageway or the second passageway comprises tubing.

7. A temperature-controlled pressure regulator of claim 6, wherein the diameter of the tubing is about 0.0675 inches.

8. A temperature-controlled pressure regulator of claim 6, wherein the tubing is at least partially disposed within the first and third openings of the heat block so that at least a portion of an outer surface of the tubing contacts inner surfaces of the openings.

9. A temperature-controlled pressure regulator of claim 1, wherein the heat source is substantially thermally isolated from the regulator body.

10. A temperature-controlled pressure regulator of claim 1, wherein the second opening comprises a bore along a longitudinal axis of the heat block.

11. A temperature-controlled pressure regulator of claim 1, further comprising a control unit operatively coupled to the heat source and having a temperature sensor to sense the temperature of the process fluid, wherein the control unit is to cause the heat source to apply heat to the heat block based on the temperature of the process fluid.

12. A temperature-controlled pressure regulator of claim 1, wherein the heat source comprises a cartridge heater.

13. A temperature-controlled pressure regulator of claim 1, wherein the heat block comprises a substantially cylindrical body.

14. A temperature-controlled pressure regulator of claim 1, wherein the heat block is disposed within the regulator body to form an air gap between an outer surface of the heat block and an inner surface of the heating chamber.

15. A temperature-controlled pressure regulator of claim 1, wherein the heat block comprises aluminum.

16. A heat block for use with a pressure regulator, comprising;
   a body to be positioned inside a chamber formed by the pressure regulator, the body having a first plurality of apertures to receive at least a portion of tubing defining a first passageway, the first passageway to separate a process fluid from the body, the body adapted to receive a heat source that is to provide heat to the process fluid via the body as the process fluid flows through the first plurality of apertures via the first passageway.

17. A heat block of claim 16, wherein the heat block further comprises a second plurality of apertures to receive a second passageway, wherein the second passageway is to separate the process fluid from the body.

18. A heat block of claim 17, wherein at least one of the first passageway or the second passageway is to fluidly couple an inlet and an outlet of the pressure regulator.

19. A heat block of claim 17, wherein the heat block includes a slot to receive at least one of the first passageway or the second passageway.

20. A heat block of claim 17, wherein the first passageway or the second passageway comprise a tube.

21. A heat block of claim 20, wherein the tube comprises metal.

22. A heat block of claim 16, wherein the body further comprises a bore along a longitudinal axis of the body.

23. A heat block of claim 22, wherein the heat source comprises a cartridge heater disposed within the bore of the heat block.

24. A heat block of claim 16, wherein the body comprises aluminum.

25. A temperature-controlled pressure regulator, comprising:
- means for heating a process fluid flowing through a pressure regulator, the means for heating positioned inside a heat chamber of a regulator body of the pressure regulator; and
- means for fluidly coupling the process fluid between an inlet and an outlet of the pressure regulator, the means for fluidly coupling the process fluid being separate from and at least partially positioned in the means for heating and to separate the process fluid from the means for heating, and the means for heating having means for receiving at least a portion of the means for fluidly coupling the process fluid such that the means for fluidly coupling at least partially passes inside the means for heating.

26. A temperature-controlled pressure regulator of claim 25, wherein the means for heating comprises second means for receiving at least a portion of a heat source.

27. A temperature-controlled pressure regulator of claim 25, wherein the means for fluidly coupling the process fluid comprises means for fluidly transporting the process fluid between an inlet and an outlet of the regulator, and wherein the means for fluidly transporting separates the process fluid from the means for heating.

28. A temperature-controlled pressure regulator of claim 25, wherein the means for heating is to coil around the means for fluidly coupling the process fluid.

29. A temperature-controlled pressure regulator of claim 25, further comprising means for thermally isolating the means for heating from the heat chamber.

* * * * *